(12) United States Patent
Salter et al.

(10) Patent No.: US 11,270,543 B2
(45) Date of Patent: Mar. 8, 2022

(54) METHOD AND SYSTEM FOR EXTERIOR VEHICLE DISPLAY CONFIGURED TO ISSUE FEEDBACK PROMPTS

(71) Applicant: Ford Global Technologies, LLC, Dearborn, MI (US)

(72) Inventors: Stuart C. Salter, White Lake, MI (US); Kristopher Karl Brown, Dearborn, MI (US); Steven Wayne Friedlander, Canton, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 16/514,075

(22) Filed: Jul. 17, 2019

(65) Prior Publication Data

US 2021/0019963 A1   Jan. 21, 2021

(51) Int. Cl.
*G07C 9/00* (2020.01)
*B60K 31/00* (2006.01)
*G07C 9/33* (2020.01)

(52) U.S. Cl.
CPC .......... *G07C 9/33* (2020.01); *B60K 31/0008* (2013.01); *G07C 9/0069* (2013.01); *B60Y 2200/112* (2013.01); *B60Y 2200/143* (2013.01); *B60Y 2300/09* (2013.01)

(58) Field of Classification Search
CPC .......... B60K 31/0008; B60Y 2200/112; B60Y 2200/143; B60Y 2300/09; G07C 9/0069; G07C 9/33; G07B 15/02; G07B 13/045; G06Q 20/14; G06Q 20/3276; G06Q 50/30; G05D 1/0088; G05D 1/021; B60Q 9/00; G06K 9/00832
See application file for complete search history.

(56) References Cited

U.S. PATENT DOCUMENTS

| 2012/0005108 | A1* | 1/2012 | Hollenshead | G06Q 30/02 |
| | | | | 705/306 |
| 2017/0018129 | A1* | 1/2017 | Huebner | G07C 9/33 |
| 2017/0153714 | A1* | 6/2017 | Gao | G06K 9/00798 |
| 2017/0316254 | A1* | 11/2017 | Hariri | G06K 9/00255 |
| 2019/0011993 | A1 | 1/2019 | Ette et al. | |
| 2019/0119970 | A1* | 4/2019 | Erlacher | B61L 15/0072 |
| 2020/0241529 | A1* | 7/2020 | Salter | B60Q 9/00 |

FOREIGN PATENT DOCUMENTS

CN   108447130 A   8/2018

OTHER PUBLICATIONS

McIntosh, Jil. "Ford's New Keyless Entry System Secure and Savvy," Metro US News, Downloaded from: https://www.metro.us/news/ford-s-new-keyless-entry-system-secure-and-savvy/tmWjbx—71TiGoC9iztrU, published Feb. 24, 2010.

* cited by examiner

*Primary Examiner* — Sisay Yacob
(74) *Attorney, Agent, or Firm* — Vichit Chea; Carlson, Gaskey & Olds, P.C.

(57) ABSTRACT

This disclosure relates to a method and system for an exterior display of a vehicle, such as an autonomous vehicle, configured to issue feedback prompts. An example method includes issuing a prompt via a human-machine interface on an exterior of a vehicle permitting an input indicative of an undesired condition of the vehicle.

20 Claims, 7 Drawing Sheets

METHOD AND SYSTEM FOR EXTERIOR VEHICLE DISPLAY CONFIGURED TO ISSUE FEEDBACK PROMPTS

TECHNICAL FIELD

This disclosure relates to a method and system for an exterior display of a vehicle, such as an autonomous vehicle, configured to issue feedback prompts.

BACKGROUND

There are various levels of autonomous vehicles. Semi-autonomous vehicles relieve a driver of some driving-related tasks. Fully autonomous vehicles do not require a driver at all, and instead use a self-driving system (SDS), which includes sensors, cameras, radar, etc., to sense its surroundings and guide itself between destinations without a human operator.

Fully autonomous vehicles are being developed for use in on-demand transportation. In such applications, a user may request a ride from a nearby autonomous vehicle via an app or website, as examples. Once the ride is confirmed, the autonomous vehicle will arrive at the user's pick-up location, allow the user to enter the vehicle, and drive the user to their drop-off location (i.e., destination). In ridesharing applications, the autonomous vehicle may pick up and drop off additional users at other pick-up and drop-off locations. In shuttle applications, the autonomous vehicle drives on a predetermined route and stops at predetermined stops along the route.

SUMMARY

A method according to an exemplary aspect of the present disclosure includes, among other things, issuing a prompt via a human-machine interface on an exterior of a vehicle. The prompt permits an input indicative of an undesired condition of the vehicle.

In a further non-limiting embodiment of the foregoing method, in response to an input indicating an undesired condition of the vehicle, the method includes issuing a prompt via the human-machine interface permitting an input indicating the vehicle should be dismissed without making a planned trip.

In a further non-limiting embodiment of any of the foregoing methods, in response to an input indicating an undesired condition of the vehicle, the method includes issuing a prompt via the human-machine interface permitting an input indicating the vehicle can continue with a planned trip.

In a further non-limiting embodiment of any of the foregoing methods, the undesired vehicle condition includes a condition of the vehicle requiring maintenance.

In a further non-limiting embodiment of any of the foregoing methods, the method includes associating the input indicating the undesired vehicle condition with a user that provided the input, and taking a particular action based on an input history of the user.

In a further non-limiting embodiment of any of the foregoing methods, in response to an input indicating an undesired vehicle condition, the method includes verifying whether the input accurately reflects a condition of the vehicle.

In a further non-limiting embodiment of any of the foregoing methods, the method includes associating the input indicating the undesired vehicle condition with a user that provided the input, and weighing future inputs from the user based on whether the input accurately reflected the condition of the vehicle.

In a further non-limiting embodiment of any of the foregoing methods, the prompt issued via the human-machine interface permits an input indicative of whether a user wishes to cancel a planned trip.

In a further non-limiting embodiment of any of the foregoing methods, the prompt permitting an input indicative of an undesired condition of the vehicle is presented following an input indicative of the user wishing to cancel the planned trip.

In a further non-limiting embodiment of any of the foregoing methods, the prompt issued via the human-machine interface permits an input requesting that the vehicle be held for a period of time.

In a further non-limiting embodiment of any of the foregoing methods, the human-machine interface displays the period of time the vehicle will be held.

In a further non-limiting embodiment of any of the foregoing methods, the human-machine interface issues a prompt permitting an input increasing the period of time.

In a further non-limiting embodiment of any of the foregoing methods, the prompt issued via the human-machine interface permits an input requesting that a cargo door of the vehicle be opened.

In a further non-limiting embodiment of any of the foregoing methods, the human-machine interface is a first human-machine interface on an exterior of a first side of the vehicle and the vehicle includes a second human-machine interface on the exterior of the first side of the vehicle.

In a further non-limiting embodiment of any of the foregoing methods, the first human-machine interface is mounted to a front door of the vehicle and the second human-machine interface is mounted to a rear door of the vehicle.

A system for a vehicle according to an exemplary aspect of the present disclosure includes, among other things, a human-machine interface on an exterior of the vehicle, and a controller in electronic communication with the human-machine interface. The controller is configured to issue a prompt via the human-machine interface permitting an input indicative of an undesired condition of the vehicle.

In a further non-limiting embodiment of the foregoing system, in response to an input indicating an undesired condition of the vehicle, the controller is configured to issue a prompt via the human-machine interface permitting an input indicating the vehicle should be dismissed without making a planned trip.

In a further non-limiting embodiment of any of the foregoing systems, in response to an input indicating an undesired condition of the vehicle, the controller is configured to issue a prompt via the human-machine interface permitting an input indicating the vehicle can continue with a planned trip.

In a further non-limiting embodiment of any of the foregoing systems, in response to an input indicating an undesired condition of the vehicle, the controller issues a particular command based on an input history of the user.

In a further non-limiting embodiment of any of the foregoing systems, the human-machine interface is a first human-machine interface on an exterior of a front door on a first side of the vehicle and the vehicle includes a second human-machine interface on an exterior of a rear door on the first side of the vehicle.

DETAILED DESCRIPTION

This disclosure relates to a method and system for an exterior display of a vehicle, such as an autonomous vehicle, configured to issue feedback prompts. This disclosure may be particularly useful when the autonomous vehicle is used in on-demand transportation applications, including ride-sharing applications, or shuttle applications. An example method includes issuing a prompt via a human-machine interface on an exterior of a vehicle permitting an input indicative of an undesired condition of the vehicle. In this way, this disclosure is capable of leveraging user inputs to determine a condition of the vehicle. This information may be used to determine whether the vehicle requires maintenance or may continue with reduced service, examples, leading to more efficient use of the vehicle. These and other benefits will be appreciated from the below description.

Figure 1A:
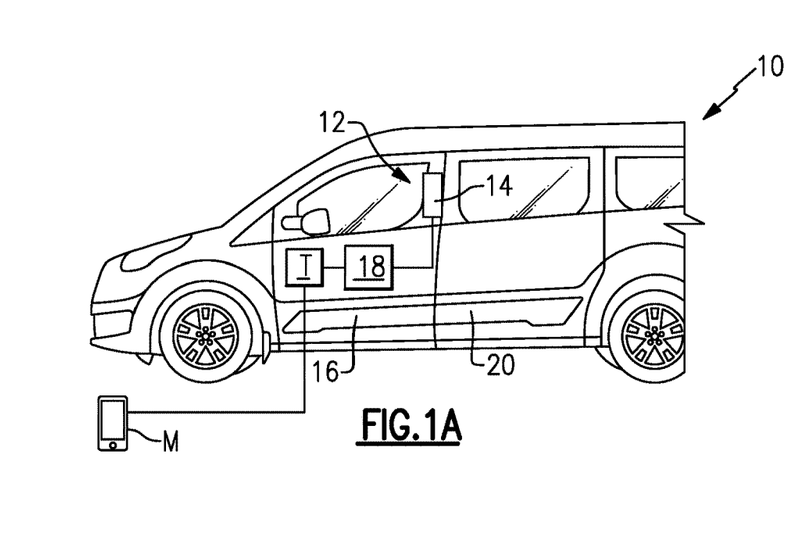
FIG. 1A is a side view of an example autonomous vehicle with a first human-machine interface on a front door.

Referring to the drawings, FIG. 1A is a view of an example autonomous vehicle 10 ("vehicle 10"), and in particular is a fully autonomous vehicle configured to sense its surroundings and control and guide itself between destinations without a human operator. The vehicle 10 includes a self-driving system (SDS), and is classified as a "Level 5" autonomous vehicle under the ranking system published by the Society of Automotive Engineers (SAE). The vehicle 10 may also be a "Level 4" autonomous vehicle. While the vehicle 10 is shown as a passenger van, this disclosure is not limited to any particular vehicle type, and extends to other types of autonomous vehicles, including autonomous cars, trucks, and sport utility vehicles, as examples. Further, while this disclosure has particular benefits in the context of autonomous vehicles, namely Level 5 autonomous vehicles, this disclosure extends to non-autonomous vehicles as well.

The vehicle 10 includes an exterior display system 12 including a plurality of electronic appliqués, screens, and/or human-machine interfaces such as touchscreens. In FIG. 1A, the autonomous vehicle includes a first human-machine interface 14 on a front door 16, which is a driver-side door of the vehicle 10. In particular, the first human-machine interface 14 is mounted to an external surface on and/or adjacent a rear edge of the front door 16, for example on and/or adjacent the B-pillar appliqué. The first human-machine interface 14 is in electronic communication with a controller 18 and is responsive to commands from the controller 18 to display information visible to those outside the vehicle 10. Further, in FIG. 1A, the first human-machine interface 14 is configured as a touchscreen, and permits users to input information, which may then be interpreted by the controller 18, saved, and/or transmitted to a central server via a transceiver T, for example. In this disclosure, the term user is used to refer to prospective passengers (i.e., before they have boarded the vehicle), current passengers, and former passengers (i.e., passengers that have exited the vehicle).

Figure 1B:
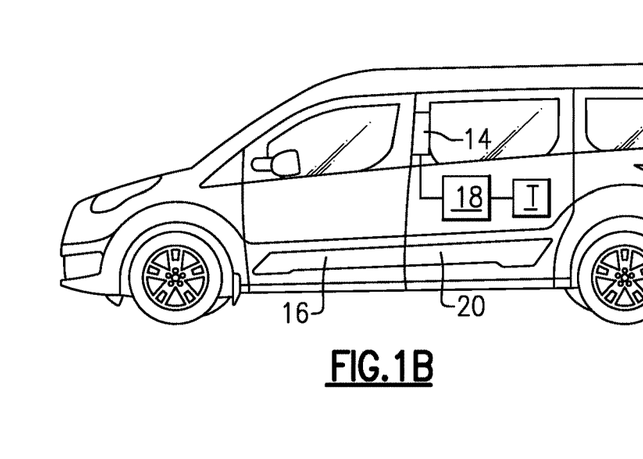
FIG. 1B is a side view of an example autonomous vehicle with a first human-machine interface on a rear door.

While in FIG. 1A there is one human-machine interface on the driver side of the vehicle 10, it should be understood that the opposite, passenger side of the vehicle 10 also includes a similar human-machine interface on a rear edge of the front passenger-side door. Further, while the first human-machine interface 14 is on the front door 16, the vehicle 10 could include the first human-machine interface on a rear door 20 of the vehicle 10, such as a rear sliding door, as shown in FIG. 1B. In particular, in FIG. 1B, the first human-machine interface 14 is mounted to an external surface on and/or adjacent a front edge of the rear door 20, such as to the B-pillar appliqué.

Figure 1C:
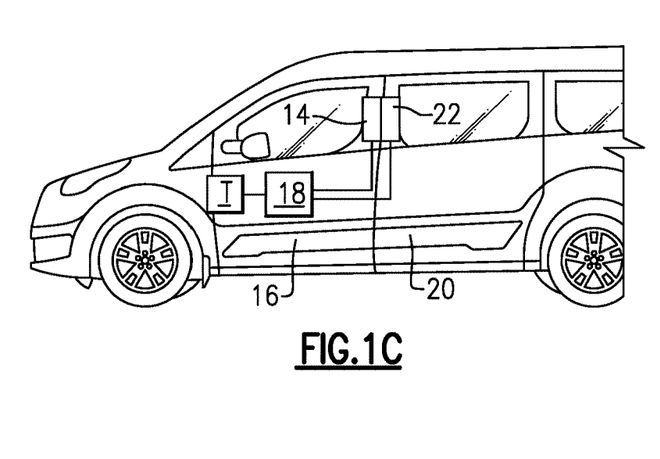
FIG. 1C is a side view of an example autonomous vehicle with a first human-machine interface on a front door and a second human-machine interface on a rear door.

Further, the vehicle 10 could include two or more human-machine interfaces on the same side of the vehicle. In FIG. 1C, the first human-machine interface 14 is mounted adjacent a rear edge of the front door 16 and a second human-machine interface 22 is mounted adjacent a front edge of the rear door 20. When present, the second human-machine interface 22 is also in electronic communication with the controller 18 and is configured to display information and receive user inputs. The first and second human-machine interfaces 14, 22 are oriented on the vehicle 10 such that a user can readily input information and discern information displayed on the side-facing displays, for example. The human-machine interfaces 14, 22 are provided by an interactive displays, such as a graphical user interfaces (GUIs), in this example. In one particular example, the human-machine interfaces 14, 22 include touchscreens, which are configured to display information to the user and allow the user to provide inputs. While only one side of the vehicle 10 is shown in FIG. 1A, it should be understood that the opposite side of the vehicle 10 may also include two similarly-arranged side-facing human-machine interfaces.

The exterior display system 12 may further be in communication with a mobile device M, as shown in FIG. 1A. The mobile device M may be a cell phone of a user. As with the human-machine interfaces 14, 22, a user may be allowed to provide inputs and to receive information via the mobile device M. In one example, the user provides inputs and receives information via a software application running on the mobile device M. The mobile device M may be in electronic communication with the controller 18 wirelessly over a BLE connection or over the Internet, as examples. The controller 18 may also be in communication with one or more speakers configured to generate sounds (including speech) and/or chimes corresponding to information displayed on the exterior display system 12. The vehicle 10, together with any mobile device(s) M, transceivers T, speakers, remote servers, etc., provide a "system" according to this disclosure.

The controller 18 is configured to receive information from the exterior display system 12 and is configured to interpret that information and issue commands to various components of the vehicle 10 based on that information. The controller 18 is shown schematically in FIGS. 1A-1C. It should be understood that the controller 18 may include hardware and software, and could be part of an overall vehicle control module, such as a vehicle system controller (VSC), or could alternatively be a stand-alone controller separate from the VSC. Further, the controller 18 may be programmed with executable instructions for interfacing with and operating the various components of the vehicle 10. The controller 18 additionally includes a processing unit and non-transitory memory for executing the various control strategies and modes of the vehicle system.

Figure 2:
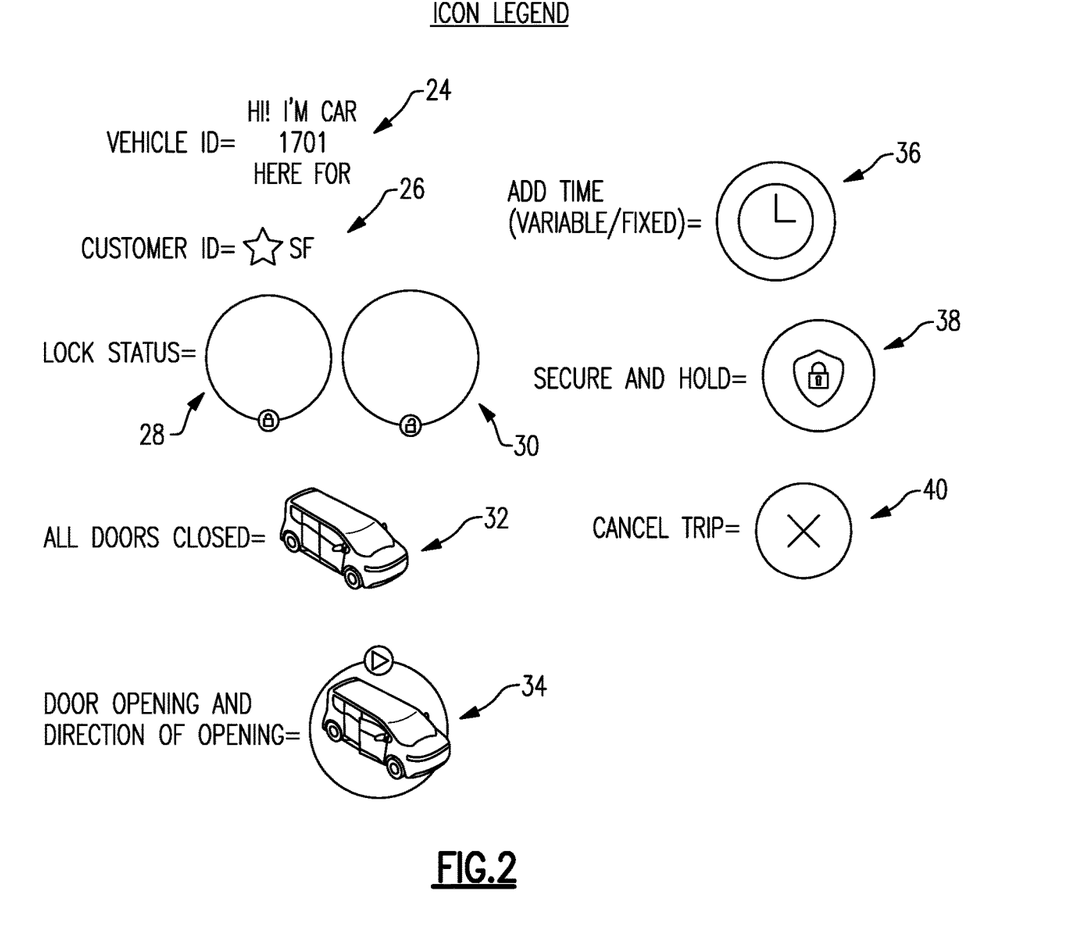
FIG. 2 illustrates example icons capable of being displayed by the first and second human-machine interfaces.

FIG. 2 illustrates example icons that may be presented to via one or more of the human-machine interfaces 14, 22 or via a user's mobile device M, for example. The icons correspond to information presented to the user or inputs available to the user. In this example, the icons include vehicle ID 24, which is a unique number or code corresponding to a particular vehicle. The icons also include customer ID 26. Vehicle ID 24 and customer ID 26 are particularly useful in on-demand and/or ridesharing applications as it allows the user to readily identify whether a particular vehicle is intended for them.

The icons also include lock status of the vehicle, such as locked icon 28 or unlocked icon 30. The icons are also able to represent whether all doors of the vehicle are closed, at 32, or whether one or more doors of the vehicle 10 are opening and, if so, what direction, at 34. Example inputs include an icon to add time, at 36, an icon configured to secure and/or hold the vehicle 10, at 38, and an icon to cancel a trip, at 40. The functionality associated with these icons will be explained in more detail below. Further, while particular icons are shown in FIG. 2, this disclosure extends to other icons, including a "maintenance" icon configured to permit the user to provide feedback regarding the condition of the vehicle 10 and an icon configured to open a cargo door of the vehicle 10, among others. The exterior display system 12 may also display various other messages and/or icons, such as "vehicle moving," "vehicle being held," "vehicle available for ride," "please board the vehicle," "cargo door open," "doors closing," etc., indicating status to users and passersby.

Various exemplary aspects of the method and system of this disclosure will now be described relative to a number of flow charts. The flow charts illustrate exemplary configurations of the human-machine interfaces 14, 22. In particular, in the flow charts, reference will be made to the embodiment of FIG. 1C in which the vehicle 10 includes two human-machine interfaces 14, 22. However, the aspects of the disclosed method and system could be performed by vehicles having one or more displays per side.

Figure 3:
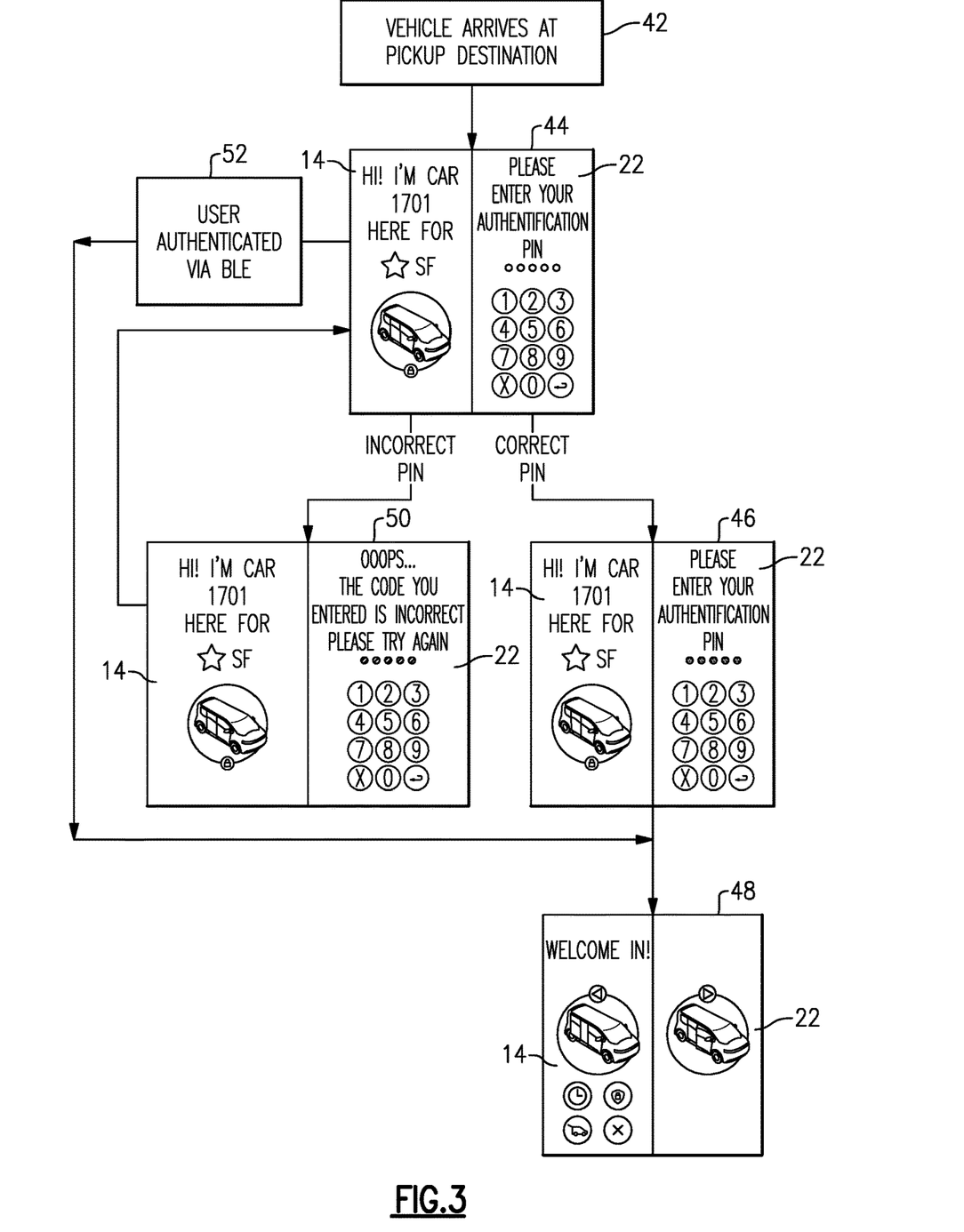
FIG. 3 illustrates a flow chart representative of an aspect of this disclosure pertaining to authentication.

A first exemplary aspect of this disclosure pertains to user authentication and is represented by the flow chart of FIG. 3. In FIG. 3, at 42, the vehicle 10 arrives at a user's pick-up location. In this example, at 44, the first human-machine interface 14 displays a vehicle ID 24, customer ID 26, and a lock status by displaying locked icon 28. The second human-machine interface 22 is a keypad permitting the user to input an alphanumeric code which may have been sent to the user's mobile device M. If the correct code is entered, at 46, the doors of the vehicle 10 are unlocked at 48. If an incorrect code is entered at 50, then the user may be given a number of attempts to retry the code before being locked out momentarily or permanently. Alternatively, the user may authenticate at 52 without entering a code such as by syncing their mobile device M to the vehicle 10 over a BLE connection, for example.

After authenticating, the user has access to additional functionality via the exterior display system 12. The user may extend a wait time, secure and hold the vehicle 10, open a cargo door of the vehicle, cancel a trip, and/or change a destination via entering an input into the exterior display system 12. Some of these functions will be described in more detail below.

Further, after authenticating, the exterior display system 12 may ask the user to confirm that it has the same number of passengers and cargo indicated when booking the ride in order to accurately track vehicle capacity. For instance, if the user initially booked a ride for three people and three pieces of luggage, but now the user only needs a ride for two people and two pieces of luggage, the exterior display system 12 can use that information to maximize use of the vehicle 10, in particular in ride sharing and/or pooling applications. If the user needs additional capacity (i.e., now there are four passengers), the vehicle 10 may need to request another vehicle and/or the user may need to accept a higher fee.

Further, after authenticating, the exterior display system 12 may inform the user of an expected trip delay due to expected traffic, for example. The exterior display system 12 may also inform the user of any other condition, such as a condition of the vehicle 10 (e.g., rear seat is wet). The user may be given the option to cancel the trip after being informed of such conditions.

Figure 4:
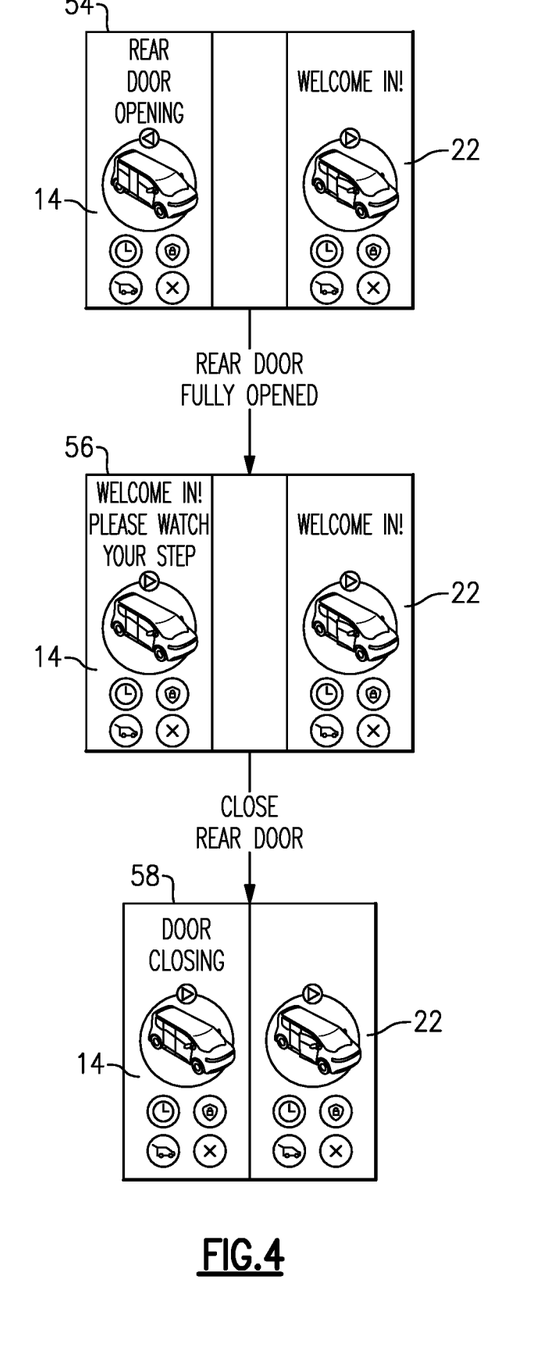
FIG. 4 illustrates a flow chart representative of an aspect of this disclosure pertaining to door operation.

A second exemplary aspect of this disclosure is represented by the flow chart of FIG. 4 and pertains to the vehicle 10 providing users with feedback as to the status of the doors, such as whether a door is opening and, if so, in what direction. FIG. 4, in particular, is representative of an example sequence in which a rear door 20 of the vehicle 10 opens. After receiving authentication, for example, in FIG. 4 the rear door 20 of the vehicle 10 begins opening at 54. In this example, the first human-machine interface 14 is static because the front door 16 is not moving. Thus, the first human-machine interface 14 displays a message indicating that the rear door 20 is opening. The second human-machine interface 22, which moves with the rear door 20, displays a message indicating the user should enter through the rear door 20. The message may include a welcome message.

At 56, with the rear door 20 fully open, both the first and second human-machine interfaces 14, 22 display welcome messages and may indicate that it is an appropriate time for the user to enter the vehicle 10. The type of message shown on a particular closure (i.e., door) may be different depending on whether the closure is closing or opening. At 58, with the users in the vehicle 10, as determined by sensors, a user input, and/or a countdown timer, one or more of the first and second human-machine interfaces 14, 22 may indicate that the rear door 20 is closing. In FIG. 4, the first human-machine interface 14 displays a message indicating that the door is closing. The second human-machine interface 22 may display a similar message or another message.

Figure 5:
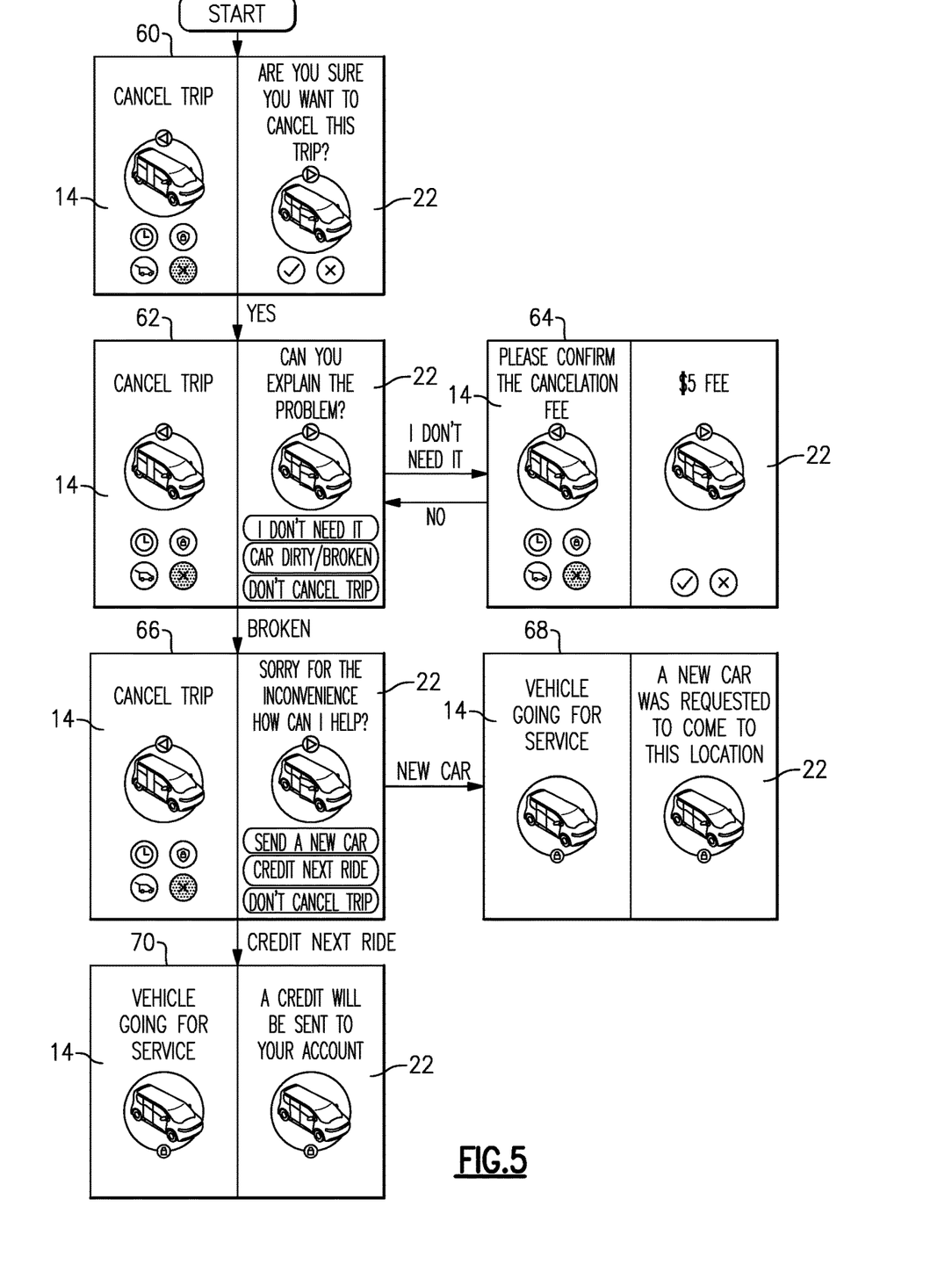
FIG. 5 illustrates a flow chart representative of an aspect of this disclosure pertaining to feedback prompts and trip cancellation.

Another exemplary aspect of this disclosure pertaining to feedback prompts and trip cancellation is represented by the flow chart of FIG. 5. In FIG. 5, a user has selected the icon 40 for "cancel trip" on the first human-machine interface 14, at 60. In response, the second human-machine interface 22 presents to the user a first in a series of prompts. The first prompt, in this example, asks the user whether they are sure that they want to cancel the trip. In this example, the user presses an icon corresponding to an affirmative answer. Here, the icon is a green check mark, corresponding to an answer of "yes."

At 62, the second human-machine interface 22 issues a feedback prompt, which permits an input indicative of an undesired condition of the vehicle. The prompt issued at 62 is one type of feedback prompt, which is a prompt permitting the user to provide feedback by way of an input into the exterior display system 12 regarding a condition of the vehicle 10 (e.g., seat wet, cargo door won't open) and/or feedback relevant to a trip (e.g., hit a pothole, delayed due to traffic).

The prompt issued at 62, in one example, includes a button indicating that the vehicle 10 requires maintenance, such as because it requires cleaning or one or more components of the vehicle 10 are not working properly. In this disclosure, undesired conditions of the vehicle are conditions that may require maintenance, such as repair or cleaning.

At 62, the second human-machine interface 22 also issues a prompt permitting the user to indicate that they no longer require the vehicle 10, such as if the user's plans have changed and a trip is no longer necessary. The second human-machine interface 22 also issues a prompt permitting the user to indicate that they have changed their mind and they no longer wish to cancel the trip, despite their affirmative input at 60.

If, at 62, the user provides an input indicating they no longer require the vehicle 10, then at 64 the second human-machine interface 22 issues a prompt informing the user that they will be charged a cancellation fee. Faced with this prompt, the user may provide an input either accepting the fee or denying the fee. If the fee is accepted, the vehicle 10 is dismissed. If the fee is denied, the user is returned to 62.

If, at 62, the user provides an input indicating that there is an undesired condition of the vehicle, at 66 the second human-machine interface 22 issues a prompt permitting an input indicating the vehicle 10 should be dismissed without making a planned trip. Such a prompt may be provided if, for example, the condition of the vehicle 10 is too dirty for comfort or if one or more components of the vehicle 10 is broken. As one example, if a cargo door of the vehicle 10 will not open, and the user required use of the cargo area of the vehicle 10 because of an intention to transport cargo, then the user may indicate that the vehicle 10 should be dismissed without taking the trip.

In other circumstances, however, the condition of the vehicle 10 may be such that the user can still take the trip with the vehicle 10 providing reduced service. For instance, if a previous passenger spilled water on a rear seat of the vehicle, a user may still be able to take a planned trip while avoiding sitting on the wet seat. Further, in the case of a wet seat, the controller 18 may be able to correlate this with weather information to determine a potential cause of the wetness. Regardless, at 66, the second human-machine interface 22 may issue a prompt permitting an input indicating the vehicle 10 can continue with a planned trip despite the reduced level of service.

Further, at 66, the second human-machine interface 22 may permit the user to provide an input requesting that a new car be sent to the pick-up location. In response to such an input, at 68 the vehicle 10 is dismissed to an inspection site or maintenance site and the exterior display system 12 displays a message indicating the vehicle 10 is not in service. At 66, the second human-machine interface 22 may also permit the user to provide an input cancelling the ride. In response to such an input, the second human-machine interface 22 may indicate that the user's account has been credited for the inconvenience, at 70, and the vehicle 10 may be sent to an inspection site or maintenance site.

In addition to relying on user inputs, the vehicle 10 can also include one or more exterior and interior sensors configured to monitor the status and condition of the vehicle 10. Such sensors may include image sensors, like cameras, weight sensors, seat moisture sensors, active air suspension sensors, wheel bearing sensors, and tire pressure sensors, as examples. The sensors may be in electronic communication with the controller 18, and the controller 18 may use information from the sensors to provide information to a user, for example. In particular, if a sensor indicates a cargo door of the vehicle 10 is broken or the cargo area is full, the controller 18 could command the first and/or second human-machine interfaces to display a corresponding message, such as "cargo area unavailable," to a user. The messages may also include whether a particular percentage of cargo space will be available to the user. The user can use this information to make an informed decision on whether they wish to continue with the ride or request another vehicle. The information may be conveyed to the user's mobile device M before the vehicle arrives such that the rider can request another vehicle.

The vehicle 10 may also use information from the sensors to indicate the status of particular seats, such as whether there is a spill on a seat, for example. Again, the controller 18 can use this information and display it to the user such that the user may make an informed decision on whether to continue with a ride. The information may also be displayed on the user's mobile device M in advance.

In another aspect of this disclosure, if the sensors lose communication with the controller 18, the controller 18 may issue feedback prompts to the user asking the user to provide inputs indicative of the information that would have been determined based on the output of the sensors. For instance, if the controller 18 loses communication with a cargo area weight sensor, the controller 18 may issue one or more feedback prompts permitting inputs as to the status or condition of the cargo area, such as whether the cargo area is full, partially full, or empty. Another example is if the controller 18 loses communication with a door sensor, the controller 18 may issue prompts to the user asking the user to confirm that a vehicle door has opened or closed.

Whenever a user is asked to provide an input about a condition of the vehicle 10, the system of this disclosure associates those inputs with that particular user, such as a profile of that particular user. The system may take a particular action based on an input history of the user (i.e., a record of the user's inputs). For instance, if a user reports a dirty vehicle, and an inspection of the vehicle confirms that it was indeed dirty, then a weight associated with that particular user's future inputs may be increased. In other words, the user is considered credible and future inputs by that user may be deemed more likely to accurately reflect vehicle condition. As such, the inputs of that user may be more likely to result in the vehicle being sent for maintenance or to a verification site. The inputs of that user may also be prioritized relative to other inputs. If, on the other hand, the user's inputs about vehicle condition are not accurate, then the weight associated with that particular user's inputs may be decreased in the future.

A user's inputs may be verified at verification sites located throughout a particular region. The verification sites need not be full maintenance sites configured to perform a repair. Rather, the verification sites may simply be a location where an authorized user, such as an employee or contractor of a ridesharing platform, is alerted to a possible undesired vehicle condition and performs a basic visual inspection to confirm that the condition exists. If so, the authorized user may send the vehicle to a maintenance site for service. The authorized user may be the one that determines whether the user's input accurately reflects a condition of the vehicle and should be weighted in a particular manner in the future.

In FIG. 5, the feedback prompts permitting an input indicative of an undesired condition of the vehicle 10 are presented following an input indicative of the user desiring to cancel the planned trip, at 60. In other examples, however, the user may provide inputs as to vehicle condition at any time by pressing a corresponding icon, such as a "maintenance" icon, for example. Alternatively, the user may provide inputs as to vehicle condition after being prompted when, for example, the vehicle 10 loses communication with one or more sensors, as discussed above.

Further, the user may be presented with additional feedback prompts asking the user to provide inputs as to vehicle condition following completion of a trip. The vehicle 10 may push the request for inputs to a mobile device M of the user or the vehicle 10 may prompt the user to provide the inputs via the exterior display system 12. The vehicle 10 may provide feedback prompts asking the user to provide inputs relative to their experience on a particular ride. Such inputs may be indicative of whether the ride was smooth or rough (i.e., vehicle 10 hit a pothole) or whether the trip took longer than expected due to traffic, for example.

Figure 6:
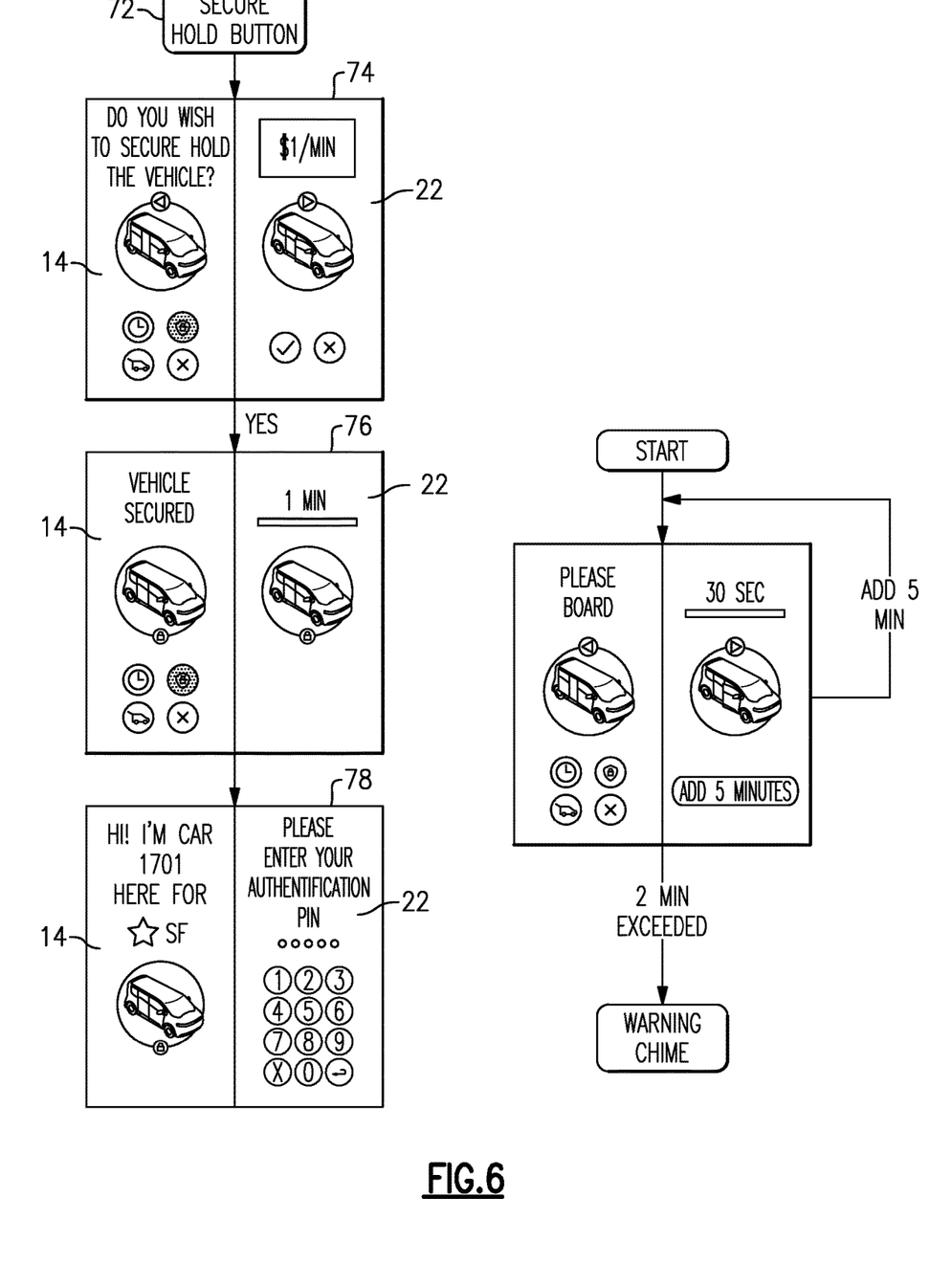
FIG. 6 illustrates a flow chart representative of an aspect of this disclosure pertaining to securing and holding the vehicle.

Another exemplary aspect of this disclosure pertaining to securing and holding the vehicle 10 is represented by the flow chart of FIG. 6. In FIG. 6, the user has pressed the icon 38, at 72, to secure and hold the vehicle 10. Securing and holding the vehicle 10 will lock the vehicle 10 and prevent movement of the vehicle 10 for a period of time. Such functionality is beneficial when the user has to make a stop and intends to return to the vehicle relatively soon, such as if the user intends to go to a convenience store. In such cases, it is more convenient for the user to hold the vehicle 10 at the drop-off location than to request another vehicle. While being secured and held, the vehicle 10 may maintain a comfortable interior climate and display information about the same via the exterior display system 12 such that passersby do not become startled when viewing the contents of an unattended the vehicle 10.

In this disclosure, at 74, the second human-machine interface 22 issues a prompt to the user asking the user to accept a fee for securing and holding the vehicle 10. The fee may be a rate of money per unit time or a flat fee. If the user accepts the fee, the user may also input a time that the user wishes to hold the vehicle 10.

At 76, the vehicle 10 is secured, meaning all doors are closed and locked, and the vehicle 10 is held in place at a particular location until the user returns or until time runs out. The second human-machine interface 22 displays the amount of time the vehicle 10 will be held. The second human-machine interface 22 may also display a countdown. The vehicle 10 may also push alerts to the mobile device M of the user informing them that the period of time is about to lapse, while offering the option to add time either via the mobile device M or one of the human-machine interfaces 14, 22. To reenter the vehicle 10, an authenticated input must be received, at 78, similar to that described relative to FIG. 3.

While the vehicle 10 is secured and held, a passerby may access a particular area of the vehicle 10, such as for vending purposes. For instance, a particular cargo area of the vehicle 10 may contain items for sale, and a passerby may access that area after authenticating and accepting a fee, for example, via the exterior display system 12. In this way, the vehicle 10 provides a vending function even when secured and held. The vehicle 10 may also serve as a locker available for use by passersby if secured and held in a particular location. The vehicle 10 may also provide passersby with directions through voice and/or a visual map displayed via the exterior display system 12. The exterior display system 12 may also permit passersby to make emergency calls.

Further, while the vehicle 10 is secured and held, a passerby may use the exterior display system 12 to order a vehicle for themselves. In other words, if a passerby approaches the vehicle 10 in an attempt to use it for a ride but discovers the vehicle 10 is being secured and held, the exterior display system 12 may issue prompts to that individual enabling them to order another vehicle to that location.

Figure 7:
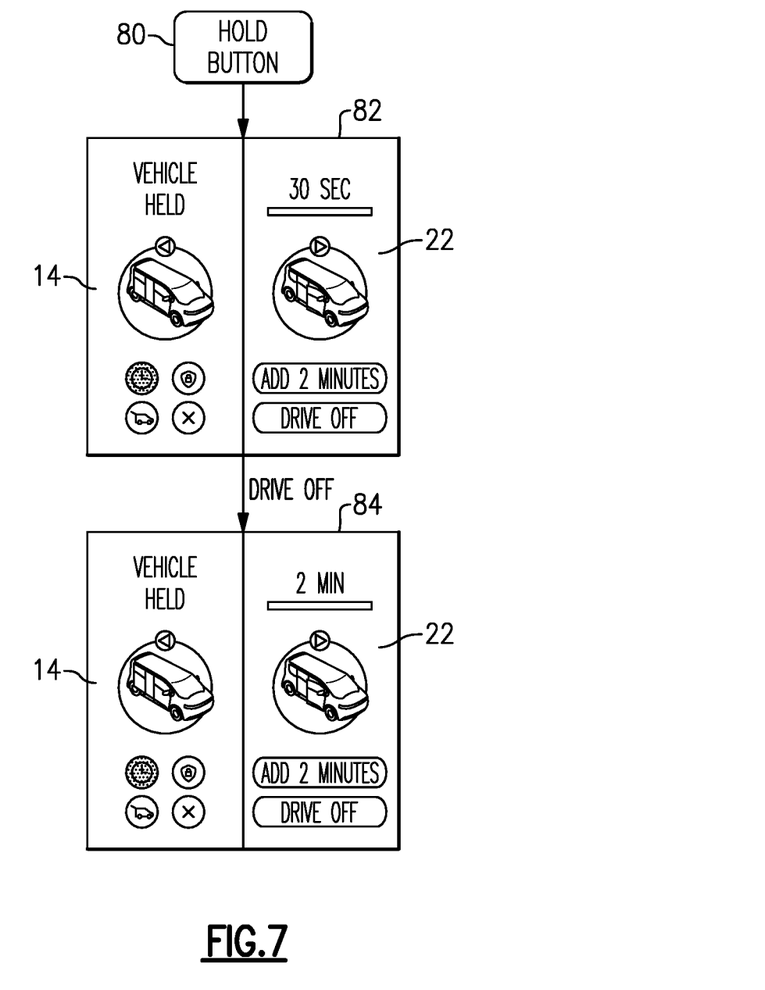
FIG. 7 illustrates a flow chart representative of an aspect of this disclosure pertaining to holding the vehicle.

An aspect of this disclosure pertaining to holding the vehicle 10 without securing it is represented by the flow chart of FIG. 7. Such functionality may be beneficial when loading the vehicle 10 with cargo. In such situations, it is beneficial to hold the vehicle 10 in place without locking the vehicle doors. In FIG. 7, the user presses the icon 36 to hold the vehicle, at 80. At 82, the second human-machine interface 22 displays a countdown of a period of time that the vehicle 10 will be held, based on a user input, and further permits an input adding to the period of time. After the period of time lapses, the vehicle 10 may close the doors, lock them, and begin a countdown after which the vehicle 10 may drive off, at 84.

While in FIGS. 3-7 there are two human-machine interfaces 14, 22, this disclosure extends to embodiments with one or more human-machine interfaces. Further, when there are two human-machine interfaces, either interface may be configured to accept inputs and display information. In other words, while the second human-machine interface 22 is primarily referenced in FIGS. 3-7, the first human-machine interface could perform the same functions.

It should be understood that terms such as "about," "substantially," and "generally" are not intended to be boundaryless terms, and should be interpreted consistent with the way one skilled in the art would interpret those terms. It should also be understood that terms such as "forward," "rear," "side," etc., are used herein relative to the normal operational attitude of the autonomous vehicle 10 for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
issuing a prompt via a human-machine interface on an exterior of a vehicle, wherein the prompt permits an input indicative of an undesired condition of the vehicle, wherein the undesired condition of the vehicle includes a condition of the vehicle requiring maintenance.

2. The method as recited in claim 1, further comprising:
in response to an input indicating an undesired condition of the vehicle, issuing a prompt via the human-machine interface permitting an input indicating the vehicle should be dismissed without making a planned trip.

3. The method as recited in claim 1, further comprising:
in response to an input indicating an undesired condition of the vehicle, issuing a prompt via the human-machine interface permitting an input indicating the vehicle can continue with a planned trip.

4. The method as recited in claim 1, further comprising:
associating the input indicating the undesired condition of the vehicle with a user that provided the input; and
taking a particular action based on an input history of the user.

5. The method as recited in claim 1, wherein the prompt issued via the human-machine interface permits an input indicative of whether a user wishes to cancel a planned trip.

6. The method as recited in claim 5, wherein the prompt permitting an input indicative of an undesired condition of the vehicle is presented following an input indicative of the user wishing to cancel the planned trip.

7. The method as recited in claim 1, wherein the prompt issued via the human-machine interface permits an input requesting that the vehicle be held for a period of time.

8. The method as recited in claim 7, wherein the human-machine interface displays the period of time the vehicle will be held.

9. The method as recited in claim 7, wherein the human-machine interface issues a prompt permitting an input increasing the period of time.

10. The method as recited in claim 1, wherein the prompt issued via the human-machine interface permits an input requesting that a cargo door of the vehicle be opened.

11. The method as recited in claim 1, wherein the human-machine interface is a first human-machine interface on an exterior of a first side of the vehicle and the vehicle includes a second human-machine interface on the exterior of the first side of the vehicle.

12. The method as recited in claim 11, wherein the first human-machine interface is mounted to a front door of the vehicle and the second human-machine interface is mounted to a rear door of the vehicle.

13. The method as recited in claim 1, wherein the condition of the vehicle requiring maintenance includes a condition of the vehicle requiring repair or cleaning.

14. A method, comprising:
issuing a prompt via a human-machine interface on an exterior of a vehicle, wherein the prompt permits an input indicative of an undesired condition of the vehicle; and
in response to an input indicating an undesired condition of the vehicle, verifying whether the input accurately reflects a condition of the vehicle.

15. The method as recited in claim 14, further comprising:
associating the input indicating the undesired condition of the vehicle with a user that provided the input; and
weighing future inputs from the user based on whether the input accurately reflected the condition of the vehicle.

16. A system for a vehicle, comprising:
a human-machine interface on an exterior of the vehicle; and
a controller in electronic communication with the human-machine interface, wherein the controller is configured to issue a prompt via the human-machine interface permitting an input indicative of an undesired condition of the vehicle, wherein the undesired condition of the vehicle includes a condition of the vehicle requiring maintenance.

17. The system as recited in claim 16, wherein, in response to an input indicating an undesired condition of the vehicle, the controller is configured to issue a prompt via the human-machine interface permitting an input indicating the vehicle should be dismissed without making a planned trip.

18. The system as recited in claim 16, wherein, in response to an input indicating an undesired condition of the vehicle, the controller is configured to issue a prompt via the human-machine interface permitting an input indicating the vehicle can continue with a planned trip.

19. The system as recited in claim 16, wherein, in response to an input indicating an undesired condition of the vehicle, the controller issues a particular command based on an input history of the user.

20. The system as recited in claim 16, wherein the human-machine interface is a first human-machine interface on an exterior of a front door on a first side of the vehicle and the vehicle includes a second human-machine interface on an exterior of a rear door on the first side of the vehicle.

* * * * *